United States Patent
Lim et al.

(10) Patent No.: US 9,333,831 B2
(45) Date of Patent: May 10, 2016

(54) INSIDE VENTILATION TECHNIQUE FOR VEHICLE

(75) Inventors: Hae Kyu Lim, Gyeonggi-do (KR); Yoon Cheol Jeon, Gyeonggi-do (KR); Yong Jin Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 687 days.

(21) Appl. No.: 13/517,822

(22) Filed: Jun. 14, 2012

(65) Prior Publication Data

US 2013/0122796 A1    May 16, 2013

(30) Foreign Application Priority Data

Nov. 16, 2011    (KR) .......................... 10-2011-0119757

(51) Int. Cl.
| | | |
|---|---|---|
| *B60H 1/00* | (2006.01) | |
| *B60L 11/18* | (2006.01) | |
| *H01M 6/50* | (2006.01) | |

(52) U.S. Cl.
CPC ........ *B60H 1/00278* (2013.01); *B60H 1/00828* (2013.01); *B60L 11/1851* (2013.01); *H01M 6/5038* (2013.01)

(58) Field of Classification Search
CPC .......... B60H 1/00828; B60H 1/00278; H01M 10/5095
USPC ......................................................... 454/75
See application file for complete search history.

(56) References Cited

U.S. PATENT DOCUMENTS

| | | | | |
|---|---|---|---|---|
| 8,354,915 | B2 * | 1/2013 | Michel et al. ................. | 340/5.72 |
| 8,614,563 | B2 * | 12/2013 | Baughman .................... | 320/118 |
| 8,664,900 | B2 * | 3/2014 | Lim et al. .................... | 318/400.2 |
| 8,774,996 | B2 * | 7/2014 | Shin et al. ....................... | 701/22 |
| 2003/0080714 | A1 * | 5/2003 | Inoue et al. ................... | 320/150 |
| 2004/0163398 | A1 * | 8/2004 | Morishita et al. ............... | 62/186 |

(Continued)

FOREIGN PATENT DOCUMENTS

| | | |
|---|---|---|
| CN | 201506355 U | 6/2010 |
| JP | H05-262144 A | 10/1993 |

(Continued)

OTHER PUBLICATIONS

Chinese Office Action for Chinese Patent Application No. 201210264305.4, mailed Oct. 28, 2015, English translation, 14 pages.

*Primary Examiner* — Steven B McAllister
*Assistant Examiner* — Frances F Hamilton
(74) *Attorney, Agent, or Firm* — Mintz Levin Cohn Ferris Glovsky and Popeo, P.C.; Peter F. Corless

(57) ABSTRACT

Disclosed is an inside ventilation system of a vehicle for a driver or an occupant to achieve a more comfortable inside environment in the summer or winter. The inside ventilation system includes a control unit configured to receive an operating signal from a smart key, sense an inside temperature of the vehicle when the operating signal is transferred and judging whether the inside temperature is deviated from a required temperature range; a comparison process of comparing the inside temperature and a battery temperature when the inside temperature is deviated from the required temperature range; and a control process of controlling a heating, ventilation, and air conditioning system (HVAC) and an operation of a battery operated fan by comparing the inside temperature and the battery temperature.

11 Claims, 2 Drawing Sheets

(56) References Cited

U.S. PATENT DOCUMENTS

| | | | |
|---|---|---|---|
| 2005/0056472 A1* | 3/2005 | Smith et al. | 180/68.1 |
| 2005/0138941 A1* | 6/2005 | Kikuchi | 62/178 |
| 2006/0075766 A1* | 4/2006 | Ziehr et al. | 62/186 |
| 2006/0080986 A1* | 4/2006 | Inoue | 62/259.2 |
| 2007/0089442 A1 | 4/2007 | Tsuchiya | |
| 2008/0117079 A1* | 5/2008 | Hassan | 340/901 |
| 2008/0117179 A1 | 5/2008 | Noh | |
| 2009/0095449 A1* | 4/2009 | Bandai et al. | 165/104.33 |
| 2009/0173471 A1* | 7/2009 | Sakamoto | 165/41 |
| 2009/0193821 A1* | 8/2009 | Ozeki et al. | 62/89 |
| 2010/0019047 A1* | 1/2010 | Flick | 236/49.3 |
| 2010/0019049 A1* | 1/2010 | Flick | 236/51 |
| 2011/0016899 A1* | 1/2011 | Ogura | 62/239 |
| 2011/0042058 A1* | 2/2011 | Kikuchi et al. | 165/287 |
| 2011/0059341 A1* | 3/2011 | Matsumoto et al. | 429/82 |
| 2011/0078694 A1* | 3/2011 | Kishita | 718/103 |
| 2011/0165829 A1* | 7/2011 | Nefcy et al. | 454/75 |
| 2012/0073797 A1* | 3/2012 | Park et al. | 165/201 |
| 2012/0241129 A1* | 9/2012 | Kohl et al. | 165/58 |
| 2013/0052490 A1* | 2/2013 | TenHouten et al. | 429/50 |
| 2013/0175022 A1* | 7/2013 | King et al. | 165/202 |
| 2013/0298586 A1* | 11/2013 | Hwang et al. | 62/239 |

FOREIGN PATENT DOCUMENTS

| | | |
|---|---|---|
| JP | H11208246 A | 8/1999 |
| JP | 2005-088752 A | 4/2005 |
| JP | 2011-116331 A | 6/2011 |
| KR | 10-2003-0020630 A | 3/2003 |
| KR | 10-2008-0019612 A | 3/2008 |
| KR | 10-2008-0100493 A | 11/2008 |
| KR | 10-2011-0004088 A | 1/2011 |
| KR | 10-2011-0101460 A | 9/2011 |

* cited by examiner

INSIDE VENTILATION TECHNIQUE FOR VEHICLE

CROSS-REFERENCE TO RELATED APPLICATION

This application claims under 35 U.S.C. §119(a) the benefit of Korean Patent Application No. 10-2011-0119757 filed on Nov. 16, 2011, the entire contents of which are incorporated herein by reference.

BACKGROUND (a) Technical Field

The present invention relates to an inside ventilation method for a vehicle configured to maintain an inside temperature of the vehicle according to the temperature of a battery to allow for occupants to have a more comfortable environment inside the cabin of a vehicle.

(b) Background Art

In general, automobile ventilation and temperature control systems can increase a driver's visibility and provide a safe driving environment by preventing a front window from becoming fogged up as well as providing a pleasant environment to an occupant under different climates and driving conditions.

The temperature control system is largely divided into an apparatus for heating the cabin of the vehicle and an apparatus for cooling the interior cabin of the vehicle. The temperature control system adjusts the temperature of the cabin by circulating air inside the cabin of the vehicle via a forced convective flow propelled by a blower motor which can be variable connected to a heat source emitted from a power generator of a vehicle body and an cooling source (e.g., air-conditioner) depending upon whether or not the cabin is too hot or too cold. Accordingly, air is distributed and supplied to various directions in the vehicle, e.g., a defrosting duct, a ventilation duct, and a floor duct by appropriately selecting the direction and air volume requested.

Temperature control systems installed in an automobile are typically provided in an instrument panel. When a driver gets in the vehicle and starts the vehicle via insertion some form of operation of the key, the driver must adjust one or more controls associated with the temperature control system to coordinate with the current temperature within the cabin of the vehicle.

However, in certain extreme temperature environments, which often occur in most to places in the world in summer or winter months, the interior of the cabin may be in some cases unbearable to its occupants at first even when, the air-conditioning or heater is turned on. For example, in the summer, the occupants may be forced to roll down their windows to allow for cross ventilation to allow all of the heat trapped in the cabin to escape.

Matters described as the background art are just to improve the background of the present invention, but it should not be understood that the matters correspond to the related art which has been already known to those skilled in the art.

SUMMARY OF THE DISCLOSURE

The present invention has been made in an effort to provide an inside ventilation method of a vehicle configured to maintain an comfortable inside temperature within a vehicle that is currently turned off by discharging air inside of the vehicle by actuating a battery operated fan based on the temperature of a battery and a charged state of the battery to provide warm air to the cabin or discharge hot air from the cabin of the vehicle to provide an comfortable environment for the occupants when they first enter the vehicle after it has been sitting in the sun or out in the cold.

An exemplary embodiment of the present invention provides an inside ventilation method of a vehicle, including: a signal transferring process of receiving an operating signal from a smart key; a inside temperature judging process of sensing, by one or more temperature sensors an inside temperature of the vehicle when the operating signal is transferred and judging whether the inside temperature is deviated from a required temperature range; a comparison process of comparing the inside temperature and a battery temperature and determining when the inside temperature deviates from the required temperature range; and a control process of controlling heating, ventilation, and air conditioning system (HVAC system) and operation of a battery operated fan based on the comparison between the inside temperature and the battery temperature. For example, the required temperature may be in the range of 20 to 30° C.

The method may further include an inside temperature range judging process of judging whether the inside temperature of the vehicle is less than 20° C. when the inside temperature deviates from the required temperature range, and when it is determined that the inside temperature is less than 20° C., the heater of the HVAC system and the battery operated fan may be controlled based on the comparison of the inside temperature and the battery temperature in the comparison process.

The method may further include a low-temperature judging process of judging whether the battery temperature is less than 0° C. when the inside temperature is lower than the battery temperature, and when it is determined that the battery temperature is less than 0° C., the heater of the HVAC system may be turned on and the battery operated fan may be turned off.

The method may further include the inside temperature range judging process of judging whether the inside temperature of the vehicle is less than 20° C. when the inside temperature deviates from the required temperature range, and when it is determined that the inside temperature is more than 30° C., the air-conditioner of the HVAC system and the to battery operated fan may be controlled based on the comparison of the inside temperature and the battery temperature in the control process.

The method may further include the high-temperature judging process of judging whether the battery temperature is more than 50° C. when the inside temperature is higher than the battery temperature in the comparison process, and when it is determined that the battery temperature is more than 50° C., the air-conditioner of the HVAC system may be turned on and the battery operated fan may be turned off.

Herein, the operating signal may be any one of a sensing signal depending on the access of the smart key to the vehicle, an inside air purification button ON-operation signal within the smart key, and/or a remote start request signal in the smart key.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
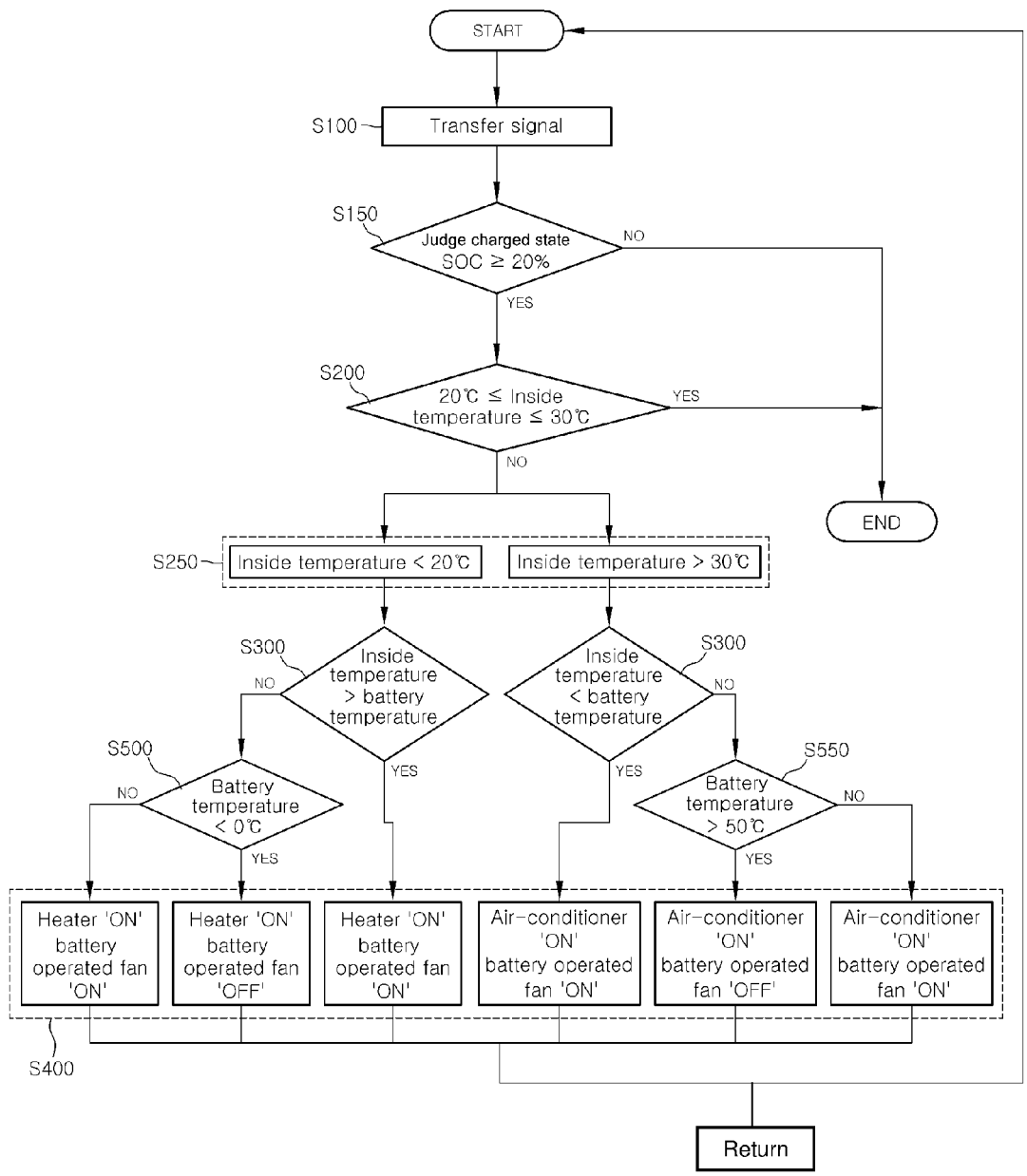
FIG. 1 is a flowchart of an inside ventilation method of a vehicle according to an exemplary embodiment of the present invention.

In the figures, reference numbers refer to the same or equivalent parts of the present invention throughout the several figures of the drawing.

DETAILED DESCRIPTION

Hereinafter, an inside ventilation method of a vehicle according to an exemplary embodiment of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc to (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
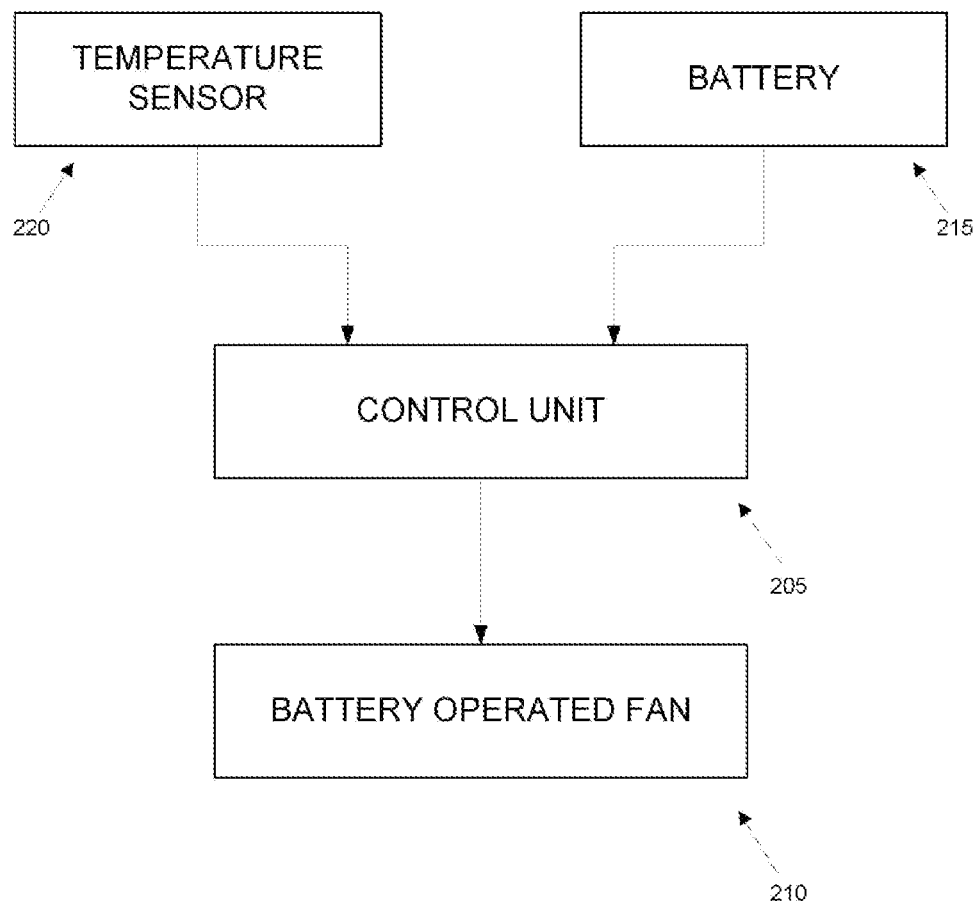
FIG. 2 is a schematic of the control system for inside ventilation method of a vehicle according to an exemplary embodiment of the present invention It should be understood that the appended drawings are not necessarily to scale, presenting a somewhat simplified representation of various preferred features illustrative of the basic principles of the invention.

The inside ventilation technique of the vehicle according to the exemplary embodiment of the present invention maintains an comfortable inside temperature by discharging inside air of the vehicle by actuating a battery 215 operated fan based on an HVAC system, a battery temperature, and a charged state of an operable battery 215 while the vehicle is turned off. The technique of the illustrative embodiment of the present invention may be controlled by a centralized control unit configured to execute a number of processes. Throughout the discussion of the method below, reference is made to the component configured to execute the method as illustrated in FIG. 2.

In particular, the control unit 205 may be configured to execute a signal transferring process (S100) of receiving an operating signal from a smart key, a inside temperature judging process (S200) of sensing, by e.g., one or more temperature sensor(s) 220, an inside temperature of the vehicle when the operating signal is transferred and judging whether the inside temperature is deviated from a required temperature range, a comparison process (S300) of comparing the inside temperature and a battery temperature when the inside temperature is deviated from the required temperature range, and a control process (S400) of controlling heating, ventilation, and air conditioning system (HVAC) and an operation of a battery operated fan 210 based upon the comparison between the inside temperature and the battery temperature.

The operation signal received in the signal transferring process may be a sensing signal dependent upon access of the smart key to the vehicle, an inside air purification button ON-operation signal in the smart key, or a remote start request signal in the smart key.

When the operation signal is transmitted, a charging judging process (S150) of judging whether the charged state of the battery 215 is within a minimum operable area range is further included before the inside temperature judging process (S200) is executed by the control unit 205.

For example, when the charged state of the battery 215 is less than 20% which is a minimum operation area in the charging judging process, the HVAC system and the battery operated fan 210 are turned off and when the charged state of the battery 215 is equal to or more than 20%, the inside temperature judging process is executed.

Herein, the required temperature range as a degree is within a temperature range that may be considered by a majority of people as a comfortable temperature range, e.g., room temperature. For example, a preferable temperature range may be 20 to 30° C. and when the required temperature range is less than 20° C., weather associated with winter may be anticipated and when the required temperature range is more than 30° C., the weather associated with summer may be anticipated.

When the inside temperature is within the required temperature range, the HVAC system and the battery operated fan 210 are turned off and when the inside temperature deviates from the required temperature, the comparison process (S300) is performed.

When the inside temperature deviates from the required temperature, an inside temperature range judging process (S250) of judging whether the inside temperature of the vehicle is less than 20° C. is further included before the comparison process is performed.

When the inside temperature is less than 20° C. in the inside temperature range judging process (S250), the heater of the HVAC system and the battery operated fan 210 are controlled through the control process executed by, e.g., a control unit 205, by comparing the inside temperature and the battery temperature in the comparison process and herein. When the inside temperature is higher than the battery temperature, the heater and the battery operated fan 210 are turned on to discharge cooled inside air to the outside while heating to heat the inside air of the vehicle to a pleasant temperature and when the inside temperature is lower than the battery temperature, the heater is turned on and the battery operated fan 210 is turned on or off depending on the battery temperature.

When the inside temperature is lower than the battery temperature, a low-temperature judging process of judging whether the battery temperature is less than 0° C. is further executed and when the battery temperature is less than 0° C., the heater of the HVAC system is turned on and the battery operated fan 210 is turned off in order to maintain a temperature which is higher than a minimum temperature within the required temperature range. In this case, when the battery temperature is 0° C. or more, the heater of the HVAC system is turned on and since the temperature of the battery is maintained to 0° C. or more, the battery operated fan 210 is turned on in order to increase the inside temperature of the vehicle.

Further, when the inside temperature is more than 30° C., the air-conditioner of the to HVAC system and the battery operated fan 210 are controlled based on a comparison between the inside temperature and the battery temperature in the control process and herein, when the inside temperature is less than the battery temperature, the air-conditioner and the battery operated fan 210 are turned on and when the inside temperature is greater than the battery temperature, the air-conditioner is turned on and the battery operated fan 210 is turned on or off depending on the battery temperature.

In this case, when the inside temperature is higher than the battery temperature, a high-temperature judging process of judging whether the battery temperature is more than 50° C. is further included and when the battery temperature is more than 50° C., the air-conditioner of the HVAC system is turned on and the battery operated fan 210 is turned off in order to maintain a temperature that is less than a maximum temperature at which durability and output performance of the battery 215 may deteriorate.

In this case, when the battery temperature is 50° C. or less, the heater of the HVAC system is turned on and since the temperature of the battery 215 is 50° C. or less, which is the maximum temperature at which the battery 215 should effectively operate, the battery operated fan 210 is turned on in order to decrease the inside temperature of the vehicle more effectively.

FIG. 1 is a flowchart of an inside ventilation method of a vehicle according to an exemplary embodiment of the present invention. The signal transferring process (S100) of receiving an operating signal such as a remote start request signal from a smart key is performed and the inside temperature judging process (S200) of sensing the inside temperature of the vehicle when the operating signal is transmitted. The control unit 205 then determines whether the inside temperature is within a required temperature range.

When the inside temperature deviates from the required temperature range, the control unit 205 may execute an inside temperature range judging process (S250) that determines whether the inside temperature of the vehicle is less than 20° C. and when the inside temperature is less than 20° C., a control process (S400) turns on the heater and the battery operated fan 210 when the inside temperature is greater than the battery temperature. The control unit 205 may also turn on the heater and turn on or off the battery operated fan 210 depending on the battery temperature when the inside temperature is lower than the battery temperature, based on data from the comparison process (S300).

When the inside temperature is less than the battery temperature in the comparison process, a low-temperature judging process (S500) of determining whether the battery temperature is less than 0° C. is performed by the control unit 205 and when it is determined that the battery temperature is less than 0° C., the heater of the HVAC system is turned on and the battery operated fan 210 is turned off. In this case, when the control unit 205 determines that the battery temperature is equal to or more than 0° C., the heater and the battery operated fan 210 are turned on.

In addition, when the inside temperature is more than 30° C., the control process (S400) of turning on the air-conditioner and the battery operated fan 210 when the inside temperature is lower than the battery temperature, turning on the air-conditioner and turning on or off the battery operated fan 210 depending on the battery temperature is performed when the inside temperature is higher than the battery temperature, by performing the comparison process (S300) of comparing the inside temperature and the battery temperature.

When the inside temperature is higher than the battery temperature in the comparison process, the high-temperature judging process (S550) of judging whether the battery temperature is more than 50° C. is performed and when it is determined that the battery temperature is more than 50° C., the air-conditioner of the HVAC system is turned on and the battery operated fan 210 is turned off. In addition, when it is determined that the battery temperature is 50° C. or less, both the air-conditioner and the battery operated fan 210 are turned on.

According to the inside ventilation method of the vehicle, the inside temperature of the vehicle can be maintained comfortably by conditioning the air inside the cabin, heat emission of the battery 215 and a temperature increase are caused by actuating a heater and a battery operated fan 210 when the inside of the vehicle is at a low temperature to improve output characteristics, thereby improving cold startability, and merchantability can be improved without cost increases to reduce a manufacturing cost as compared with competitive products.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined to by the appended claims.

What is claimed is:

1. An inside ventilation method of a vehicle, comprising:
receiving, by a control unit, an operating signal from a smart key;
sensing, by one or more temperature sensor, an inside temperature of the vehicle once the operating signal is transmitted to the control unit determining, by the control unit, whether the inside temperature deviates from a required temperature range;
comparing, by the control unit, the inside temperature and a battery temperature when the inside temperature deviates from the required temperature range;
controlling, by the control unit, a heating, ventilation, and air conditioning system (HVAC) and operation of a battery operated fan based upon the comparison of the inside temperature and the battery temperature;
determining, by the control unit, whether the inside temperature of the vehicle is less than 20° C. when the inside temperature deviates from the required temperature;
wherein when the control unit determines that the inside temperature is less than 20° C., the heater of the HVAC and the battery operated fan are controlled based on the comparison of the inside temperature and the battery temperature; and
determining, by the control unit, whether the battery temperature is less than 0° C. when the inside temperature is less than the battery temperature,
wherein when the control unit determines that the battery temperature is less than 0° C., the heater of the HVAC is turned on and the battery operated fan is turned off.

2. The inside ventilation method of a vehicle of claim 1, further comprising determining, by the control unit, whether a charged state of the battery is within a minimum operable area (SOC) range before determining whether the inside temperature deviates from the required temperature range.

3. The inside ventilation method of a vehicle of claim 1, wherein the required temperature range is 20 to 30° C.

4. An inside ventilation method of a vehicle, comprising:
receiving, by a control unit, an operating signal from a smart key;
sensing, by one or more temperature sensor, an inside temperature of the vehicle once the operating signal is transmitted to the control unit determining, by the control unit, whether the inside temperature deviates from a required temperature range;
comparing, by the control unit, the inside temperature and a battery temperature when the inside temperature deviates from the required temperature range;
controlling, by the control unit, a heating, ventilation, and air conditioning system (HVAC) and operation of a battery operated fan based upon the comparison of the inside temperature and the battery temperature;
determining, by the control unit, whether the inside temperature of the vehicle is less than 20° C. when the inside temperature deviates from the required temperature range,
wherein when the control unit determines that the inside temperature is more than 30° C., the air-conditioner of the HVAC and the battery operated fan are controlled based on a comparison of the inside temperature and the battery temperature; and
determining, by the control unit, whether the battery temperature is more than 50° C. when the inside temperature is greater than the battery temperature,
wherein when the control unit determines that the battery temperature is more than 50° C., the air-conditioner of the HVAC is turned on and the battery operated fan is turned off.

5. The inside ventilation method of a vehicle of claim 1, wherein the operating signal is any one of a sensing signal depending on access of a smart key to the vehicle, an inside air purification button ON-operation signal in the smart key, and a remote start request signal in the smart key.

6. An system for ventilating a vehicle, comprising:
a smart key configured to send operating signals to initiate an automatic vehicle ventilation process;
one or more temperature sensors configured to sense an inside temperature of the vehicle; and
a control unit installed within the vehicle and configured to receive the operating signal from a smart key, determine whether the inside temperature deviates from a required temperature range, compare the inside temperature and a battery temperature when the inside temperature deviates from the required temperature range, and control a heating, ventilation, and air conditioning system (HVAC) and operation of a battery operated fan based upon the comparison of the inside temperature and the battery temperature
wherein the control unit is further configured to determine whether the inside temperature of the vehicle is less than 20° C. when the inside temperature deviates from the required temperature, and when the control unit determines that the inside temperature is less than 20° C., the heater of the HVAC and the battery operated fan are controlled based on the companion of the inside temperature and the battery temperature; and
wherein the control unit is further configured to determines whether the battery temperature is less than 0° C. when the inside temperature is less than the battery temperature, and when the control unit determines that the battery temperature is less than 0° C., the heater of the HVAC is turned on and the battery operated fan is turned off.

7. The system of claim 6, wherein the control unit is further configured to determine whether a charged state of the battery is within a minimum operable area (SOC) range before determining whether the inside temperature deviates from the required temperature range.

8. The system of claim 6, wherein the required temperature range is 20 to 30° C.

9. A system for ventilating a vehicle, comprising:
a smart key configured to send opt-rating signals to initiate an automatic vehicle ventilation process;
one or more temperature sensors configured to sense an inside temperature of the vehicle;
a control unit installed within the vehicle and configured to receive the operating signal from a smart key, determine whether the inside temperature deviates from a required temperature range, compare the inside temperature and a battery temperature when the inside temperature deviates from the required temperature range, and control a heating, ventilation, and air conditioning system (HVAC) and operation of a battery operated fan based upon the comparison of the inside temperature and the battery temperature;
wherein the control unit is further configured to determine whether the inside temperature of the vehicle is less than 20° C. when the inside temperature deviates from the required temperature range, and when the control unit determines that the inside temperature is more than 30° C. the air-conditioner of the HVAC and the battery operated fan are controlled, based on a comparison the inside temperature and the battery temperature; and
wherein the control unit is further configured to determine whether the battery temperature is more than 50° C. when the inside temperature is greater than the battery temperature, and when the control unit determines that the battery temperature is more than 50° C., the air-conditioner of the HVAC is turned on and the battery operated fan is turned off.

10. The system of claim 6, wherein the operating signal is any one of a sensing signal depending on access of a smart key to the vehicle, an inside air purification button ON-operation signal in the smart key, and a remote start request signal in the smart key.

11. A non-transitory computer readable medium containing program instructions executed by a processor or controller, the computer readable medium comprising:
program instructions that determine whether an inside temperature deviates from a required temperature range once an operating signal has been received from a smart key;
program instructions that compare the inside temperature and a battery temperature when the inside temperature deviates from the required temperature range;
program instructions that control heating, ventilation, and air conditioning (HVAC) and operation of a battery operated fan based upon the comparison of the inside temperature and the battery temperature;
program instructions that determine whether the inside temperature of the vehicle is less than 20° C. when the inside temperature deviates from the required temperature, and when the control unit determines that the inside temperature is less than 20° C., the heater of the HVAC and the battery operated fan are controlled based on the comparison of the inside temperature and the battery temperature;
program instructions that determine whether the battery temperature is less than 0° C. when the inside temperature is less than the battery temperature, and when the program instructions determine that the battery temperature is less than 0° C., the heater of the HVAC is turned on and the battery operated fan is turned off;
program instructions that determine whether the inside temperature of the vehicle is less than 20° C. when the inside temperature deviates from the required temperature range, and when the control unit determines that the inside temperature is more than 30° C., the air-conditioner of the HVAC and the battery operated fan are controlled based on a comparison of the inside temperature and the battery temperature; and program instructions that determine whether the battery temperature is more than 50° C. when the inside temperature is greater than the battery temperature, and when the program instructions determine that the battery temperature is more than 50° C., the air-conditioner of the HVAC is turned on and the battery operated fan is turned off.

* * * * *